Oct. 5, 1937.    F. F. MUSSELMAN    2,094,924
CHECK VALVE FOR MUD JACKS
Filed Sept. 24, 1935
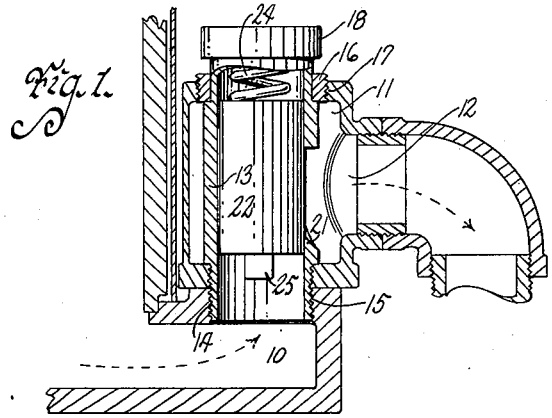
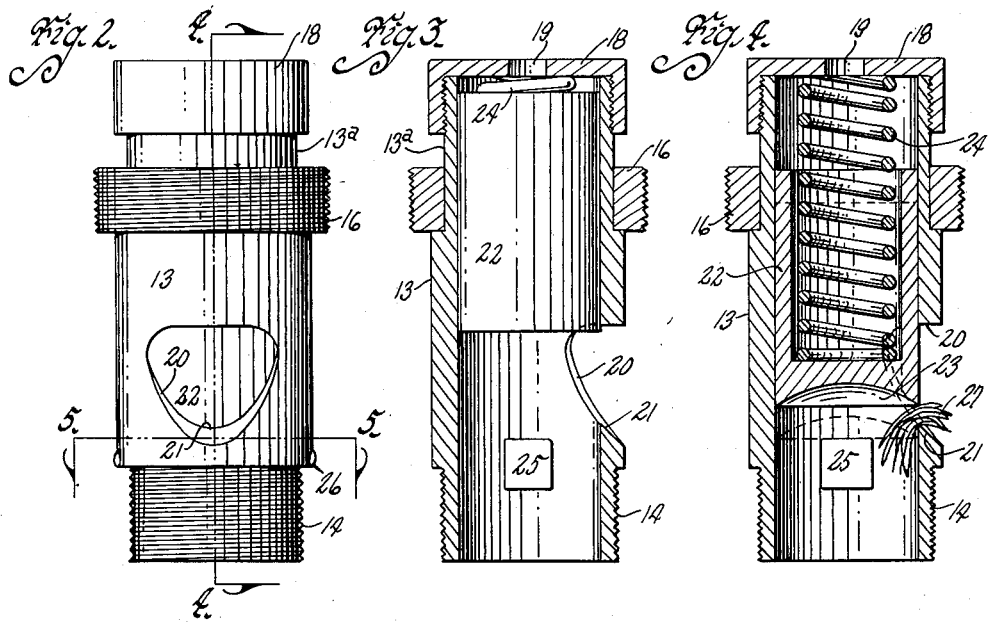
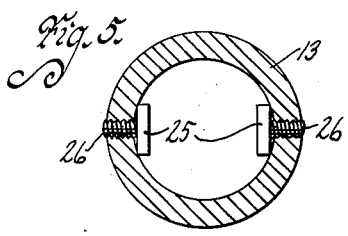
Inventor
Fred F. Musselman
By Bair, Freeman & Sinclair
Attorneys
Witness
Edw. Seeley Patented Oct. 5, 1937

2,094,924

UNITED STATES PATENT OFFICE 2,094,924

CHECK VALVE FOR MUD JACKS

Fred F. Musselman, Leon, Iowa, assignor of one-half to Edwin L. Cain, Leon, Iowa Application September 24, 1935, Serial No. 41,925

1 Claim. (Cl. 251—144)

My invention relates to a check valve particularly adapted for use with a mud jack.

It is the object of my invention to provide a check valve particularly constructed to fit into the commercial mud jack, and which will operate efficiently under the conditions to which it is there subjected.

It is my object to provide a valve of the kind described, having a sliding valve member spring-pressed in one direction, mounted in a casing, the parts having such construction that the valve will handle grass and the like, which may be mixed with the mud.

Another of my objects is to provide a complete valve assembly which can be installed in standard commercial mud jacks in place of the valve assemblies now used therein.

With these and other objects in view, my invention consists in the construction, arrangement and combination of the various parts of my check valve for a mud jack, whereby the objects contemplated are attained, as hereinafter more fully set forth, pointed out in my claim, and illustrated in the accompanying drawing, in which:

Figure 1 is a vertical, sectional view of my valve installed in a mud jack.

Figure 2 is a side elevation of the valve.

Figure 3 is a vertical section of the valve casing with the valve therein.

Figure 4 is a vertical section of the valve and the casing taken on the line 4—4 of Figure 2; and Figure 5 is a horizontal, sectional view taken on the line 5—5 of Figure 2.

A mud jack is a machine used for pumping mud under pavement to raise low spots in the pavement. Dirt, preferably black loam where it is available, is mixed with water and pumped through a check valve to a discharge nozzle. In the machines now in use, great difficulty has been experienced in finding a check valve which would operate satisfactorily. Some gravel and chunks of mud and grass get into the mixture and interfere with the operation of the valve. My valve is so constructed as to eliminate these difficulties.

In the accompanying drawing, I have shown a part of the mud jack structure, including a passage indicated by the reference numeral 10 communicating with a chamber 11, having a discharge outlet 12.

My valve comprising a tubular casing 13, having a reduced, externally threaded, lower end 14 adapted to screw into the passage 15 between the passage 10 and the chamber 11. The upper end of the valve casing is reduced as at 13a, and has an externally threaded ring 16 brazed or otherwise secured to it. This ring screws into the opening 17 in the top of the chamber 11.

The valve casing is provided at the top with a screw cap 18, having a vent opening 19. The valve casing has in its side wall an outlet 20. This outlet is wider at the top and tapered toward the lower end, as shown particularly in Figure 2. The parts are installed with the opening 20 toward the outlet 12 of the casing 11.

The wall of the casing at the lower part of the opening 20 is beveled from the outside upwardly and inwardly as indicated at 21 to allow a sharp shearing edge at the inside.

The movable valve member is a piston 22, in the form of a cylindrical member open at its upper end and arranged to slide in the casing 13. The piston 22 is closed at its lower end and its under surface is preferably concave as indicated at 23.

A strong coil spring 24 is received within the end of the piston valve 22 and abuts against the screw cap 18.

In the operation of the machine, the mud solution is pumped through the passage 10 in the direction indicated by the arrow in Figure 1 and then passes upwardly through the lower end of the valve in the passage 15, forcing the valve upwardly against the tension of the spring 24, compressing that spring and moving the valve to position where it allows the mud solution to pass out through the opening 20 in the passage 12, toward the discharge nozzle not shown.

When the pressure of the pump, not shown, is down, the spring 24 forces the piston downwardly for closing the opening 20.

On the inside of the casing 13 just below the opening 20 are stops 25 having screw-threaded members 26 screwed into the wall of the casing as shown in Figure 5. These stops limit the downward movement of the piston 22.

A piston valve of this kind will not be held unseated, as does the ball valve ordinarily used in mud jacks.

One of the worst difficulties experienced in mud jacks arises from the fact that the dirt used generally contains some grass or fibrous roots, which interfere with the operation of the check valve. In Figure 4, I have shown at 27 how grass or roots are likely to lodge almost anywhere in the path of the passage of the mud.

One of the worst places for the grass to lodge is where it interferes with the seating of the valve.

Where a valve of the kind herein disclosed is employed, if the grass lodges on the lower edge of the opening 20, it will be seen that when the spring forces the valve down, the valve will ordinarily shear the grass or roots, and on the discharge stroke of the pump that portion of the grass or roots left in the valve or in the passage 10 will be driven out.

On account of the tapered lower end of the opening 20, it will be seen that even if small bunches of grass should lodge in the opening, they will be so compressed as to leave a practically tight joint.

I have found by actual use of the valve that if grass should thus lodge, the shape of the opening is such that the grass is compacted and does not materially interfere with the operation of the machine.

It is necessary in the use of a mud jack to clean the valve after every day's operation, and with a valve of this kind, the cleaning is easily accomplished. The cap 18 can be taken off and the valve washed and the casing flushed, after each day's operation to avoid leaving caked mud on the parts.

I have found that the substitution of my valve, instead of the valve used in a standard mud jack, increases the capacity of the machine substantially. In a specific instance, the increase was over 15%.

It will be obvious from the foregoing description that my valve is peculiarly adapted for fitting into the parts of a standard machine, and that it will operate effectively to accomplish its purpose. Some parts might be modified, and it is my intention to cover by my claim any modification in structure or arrangement of parts which may be reasonably included within its scope and the scope of my invention.

I claim:

A valve structure for installation and use in a mud jack having a chamber with an end inlet and a side outlet, and an end opening, comprising a tubular valve casing, having near its intake end an external annular shoulder and a reduced threaded extension for forming a joint with the chamber wall at such inlet, said casing having an external annular shoulder spaced from its opposite end for cooperating with a joint sealing means, said opposite end being adapted for projecting exteriorly of said chamber, said casing having in its wall an opening tapered toward its lower end with a sharp inner edge at such tapered part, a stop below such opening on the interior of the casing wall, a sleeve-like chamber proper closed at one end slidable in the casing to cooperate with said last-named opening, a screw cap on said opposite end of the casing, and a coil spring received in such sleeve-like chamber proper and abutting against the inside of the end of the cap.

FRED F. MUSSELMAN.